United States Patent
Lu

(10) Patent No.: US 10,773,501 B2
(45) Date of Patent: Sep. 15, 2020

(54) MULTIPLE LAYER INTERLAYER RESISTING DEFECT FORMATION

(71) Applicant: Solutia Inc., St. Louis, MO (US)

(72) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 134 days.

(21) Appl. No.: 15/834,580

(22) Filed: Dec. 7, 2017

(65) Prior Publication Data

US 2018/0354245 A1    Dec. 13, 2018

Related U.S. Application Data

(63) Continuation of application No. 14/505,191, filed on Oct. 2, 2014, now Pat. No. 10,252,500.

(51) Int. Cl.

| | |
|---|---|
| *B32B 17/10* | (2006.01) |
| *B32B 27/08* | (2006.01) |
| *B32B 27/22* | (2006.01) |
| *B32B 27/30* | (2006.01) |
| *B32B 27/36* | (2006.01) |
| *B32B 27/42* | (2006.01) |
| *B32B 7/02* | (2019.01) |

(52) U.S. Cl.
CPC .............. *B32B 27/30* (2013.01); *B32B 7/02* (2013.01); *B32B 17/10577* (2013.01); *B32B 17/10761* (2013.01); *B32B 27/08* (2013.01); *B32B 27/22* (2013.01); *B32B 27/306* (2013.01); *B32B 27/308* (2013.01); *B32B 27/36* (2013.01); *B32B 27/365* (2013.01); *B32B 27/42* (2013.01); *B32B 2250/02* (2013.01); *B32B 2250/03* (2013.01); *B32B 2250/24* (2013.01); *B32B 2270/00* (2013.01); *B32B 2307/102* (2013.01); *B32B 2307/40* (2013.01); *B32B 2307/50* (2013.01); *B32B 2307/536* (2013.01); *B32B 2307/558* (2013.01); *B32B 2307/56* (2013.01); *B32B 2419/00* (2013.01); *B32B 2457/12* (2013.01); *B32B 2605/006* (2013.01)

(58) Field of Classification Search
CPC .............. B32B 7/02; B32B 17/10577; B32B 17/10761; B32B 27/08; B32B 27/22; B32B 27/306; B32B 27/308; B32B 27/36; B32B 27/365; B32B 27/42; B32B 2457/12; B32B 2605/006
See application file for complete search history.

(56) References Cited

U.S. PATENT DOCUMENTS

| | | |
|---|---|---|
| 2,282,026 A | 5/1942 | Bren et al. |
| 2,282,057 A | 5/1942 | Hopkins et al. |
| 2,456,366 A | 12/1948 | Bren et al. |
| 3,644,594 A | 2/1972 | Mont |
| 4,165,397 A | 8/1979 | Ogden |
| 4,361,625 A | 11/1982 | Beckmann et al. |
| 4,874,814 A | 10/1989 | Cartier |
| 4,968,744 A | 11/1990 | Misra et al. |
| 5,169,897 A | 12/1992 | Walls |
| 5,190,826 A | 3/1993 | Asahina et al. |
| 5,290,660 A | 3/1994 | Eian et al. |
| 5,336,565 A | 8/1994 | Muromachi et al. |
| 5,340,654 A | 8/1994 | Ueda et al. |
| 5,409,734 A | 4/1995 | Lee et al. |
| 5,593,786 A | 1/1997 | Parker et al. |
| 5,728,472 A | 3/1998 | D'Errico |
| 5,812,332 A | 9/1998 | Freeman |
| 5,830,568 A | 11/1998 | Kondo |
| 6,534,152 B2 | 3/2003 | Freeman |
| 6,733,872 B2 | 5/2004 | Nagai |
| 6,984,679 B2 | 1/2006 | Papenfuhs et al. |
| 7,121,380 B2 | 10/2006 | Garnier et al. |
| 7,452,608 B2 | 11/2008 | Fukatani et al. |
| 7,510,771 B2 | 3/2009 | Lu |
| 7,854,993 B2 | 12/2010 | Lu |
| 7,883,761 B2 | 2/2011 | Bourcier et al. |
| 8,470,908 B2 | 6/2013 | Frank |
| 8,597,792 B2 | 12/2013 | Meise et al. |
| 8,715,815 B2 | 5/2014 | Shimamoto |
| 8,741,439 B2 | 6/2014 | Shimamoto et al. |
| 8,920,930 B2 | 12/2014 | Meise et al. |
| 9,114,595 B2 | 8/2015 | Bourcier et al. |
| 9,238,354 B2 | 1/2016 | Iwamoto |
| 9,789,668 B2 | 10/2017 | Matsuda et al. |
| 2003/0139520 A1 | 7/2003 | Toyoma |

(Continued)

FOREIGN PATENT DOCUMENTS

| | | |
|---|---|---|
| DE | 10343385 A1 | 4/2005 |
| DE | 102008001512 A1 | 11/2009 |

(Continued)

OTHER PUBLICATIONS

ChemicalBook, Triethylene glycol bis(2-ethylhexanoate), Access Jul. 13, 2015, First Page.

(Continued)

*Primary Examiner* — Maria V Ewald
*Assistant Examiner* — Ethan Weydemeyer
(74) *Attorney, Agent, or Firm* — Michelle Bugbee

(57) ABSTRACT

Multilayered interlayers comprising stiff skin or outer layers and a soft core layer(s) are disclosed. The multilayered interlayers comprise: a first polymer layer (skin layer) comprising plasticized poly(vinyl butyral) resin; a second polymer layer (core layer) comprising a blend of two (or more) plasticized poly(vinyl butyral) resins having different residual hydroxyl content; and optionally a third polymer layer (skin layer) comprising plasticized poly(vinyl butyral) resin.

20 Claims, No Drawings

(56) References Cited

U.S. PATENT DOCUMENTS

| | | |
|---|---|---|
| 2004/0065229 A1 | 4/2004 | Papenfuhs et al. |
| 2004/0219365 A1 | 11/2004 | Yuan |
| 2005/0142332 A1 | 6/2005 | Sauer |
| 2006/0008648 A1 | 1/2006 | Bennison |
| 2006/0008658 A1 | 1/2006 | Fukatani et al. |
| 2006/0210776 A1 | 9/2006 | Lu et al. |
| 2007/0036956 A1 | 2/2007 | Chen et al. |
| 2007/0122629 A1 | 5/2007 | Chen et al. |
| 2007/0148472 A1 | 6/2007 | Masaki et al. |
| 2007/0248809 A1 | 10/2007 | Haldeman et al. |
| 2007/0289693 A1 | 12/2007 | Anderson et al. |
| 2008/0268270 A1 | 10/2008 | Chen et al. |
| 2008/0280076 A1 | 11/2008 | Hayes et al. |
| 2008/0286542 A1 | 11/2008 | Hayes et al. |
| 2008/0306190 A1 | 12/2008 | Weiss |
| 2009/0011230 A1 | 1/2009 | Rymer et al. |
| 2009/0218034 A1 | 9/2009 | Kawabe |
| 2009/0226750 A1 | 9/2009 | Lu |
| 2009/0233090 A1 | 9/2009 | Wong |
| 2009/0293952 A1 | 12/2009 | Koran et al. |
| 2009/0303604 A1 | 12/2009 | Martin |
| 2010/0028642 A1 | 2/2010 | Steuer et al. |
| 2010/0040868 A1 | 2/2010 | Fukatani et al. |
| 2010/0124647 A1 | 5/2010 | Keller et al. |
| 2010/0233493 A1 | 9/2010 | Marumoto |
| 2010/0314900 A1 | 12/2010 | Labrot et al. |
| 2011/0049434 A1 | 3/2011 | Ootsuki |
| 2011/0076459 A1 | 3/2011 | Lu |
| 2011/0096555 A1 | 4/2011 | Pires et al. |
| 2012/0003428 A1 | 1/2012 | Miyai |
| 2012/0133764 A1 | 5/2012 | Hurlbut |
| 2012/0263958 A1 | 10/2012 | Iwamoto et al. |
| 2012/0288722 A1 | 11/2012 | Iwamoto |
| 2013/0022824 A1 | 1/2013 | Meise et al. |
| 2013/0022825 A1 | 1/2013 | Meise et al. |
| 2013/0074931 A1 | 3/2013 | Chen |
| 2013/0157065 A1 | 6/2013 | Shimamoto et al. |
| 2013/0183532 A1 | 7/2013 | Shimamoto et al. |
| 2013/0189527 A1 | 7/2013 | Meise et al. |
| 2013/0236693 A1 | 9/2013 | Lu |
| 2013/0236711 A1 | 9/2013 | Lu |
| 2013/0273378 A1 | 10/2013 | Iwamoto et al. |
| 2013/0274396 A1 | 10/2013 | Arendt et al. |
| 2013/0323516 A1 | 12/2013 | Shimamoto et al. |
| 2014/0000977 A1 | 1/2014 | Matsuda et al. |
| 2014/0349124 A1 | 11/2014 | Shimamoto et al. |
| 2015/0158276 A1 | 6/2015 | Thompson et al. |
| 2015/0258747 A1 | 9/2015 | Miyai |
| 2015/0306853 A1 | 10/2015 | Beekhuizen |
| 2016/0046783 A1 | 2/2016 | Asanuma |
| 2016/0046784 A1 | 2/2016 | Asanuma |
| 2017/0225435 A1 | 8/2017 | Hirano et al. |

FOREIGN PATENT DOCUMENTS

| | | | |
|---|---|---|---|
| EP | 2623474 A1 | | 8/2013 |
| JP | 05-104687 A | | 4/1993 |
| JP | H05-138840 A | | 6/1993 |
| JP | 05-310449 A | | 11/1993 |
| JP | H6-273327 A | | 9/1994 |
| JP | 09-156967 A | | 6/1997 |
| JP | 2001-206742 A | | 7/2001 |
| JP | 2013/010671 A | | 1/2013 |
| JP | 2013/122643 A | | 6/2013 |
| KR | 20130049046 A | | 11/2013 |
| MX | 2017 003991 A | | 7/2017 |
| WO | WO 2006/102049 A3 | | 12/2006 |
| WO | WO 2010/108975 A1 | | 9/2010 |
| WO | WO 2012/092366 | | 7/2012 |
| WO | WO 2014/022663 A1 | | 2/2014 |
| WO | WO 2014/158786 A1 | | 10/2014 |

OTHER PUBLICATIONS

Ellis, Bryan and Ray Smith. "Polymers—A Property Database ($2^{nd}$ Edition)", Dec. 2009, Taylor & Francis, $2^{nd}$ Edition, p. 573.
http://www.chemicalbook.com/ChemicalProductProperty_EN_CB0225180.htm; Jul. 2011.
Sigma-Aldrich®. "Poly(3-methyl-1,5-pentanediol Adipate)," Retrieved Apr. 11, 2016, p. 1.
Dupont, Untitled [discloses comparisons between PVB and SGP interlayers used in safety glass], accessed on Sep. 12, 2016, Dupont.com, obtained from http://www2.dupont.com/Building_Innovations/zh_CN/assets/downloads/SGPintro_E.pdf.
PubChem, Glutaraldehyde, accessed on Sep. 12, 2016, NIH.gov, obtained from https://pubchem.ncbi.nlm.nih.gov/compound/glotaraldehyde#section=Top.
Sigma-Aldrich, Tri(ethylene glycol) bis(2-ethylhexanoate), accessed on Sep. 12, 2016, Sigmaaldrich.com, obtained from http://www.sigmaaldrich.com/catalog/product/aldrich/525103?lang-en®ion=US.
AzoM, Indium Tin Oxide (ITO)—Properties and Applications, Jan. 23, 2004, Azo Materials, obtained from http://www.azom.com/article.aspx?ArticleID=2349.
Sigma-Aldrich "Di(propylene glycol) dibenzoate" retrieved Jul. 1, 2016, 3 pages.
Wade, B.E., Vinyl Acetal Polymers, in Encyclopedia of Polymer Science & Technology, 3rd edition, vol. 8, pp. 381-399, (2003).
"Aerosil MOX 170 MSDS"; Evonik Industries, Jun. 25, 2016; pp. 1-12.
Hallensleben, Manfred L. et al.; "Polyvinyl Compounds, Others"; Ullmann's Encyclopedia of Industrial Chemistry; Jul. 2015; pp. 1-23.
Naje, Asama Natik, et al.; "Effect of Indium Tin Oxide (ITO) Nanoparticles on the Optical Properties of PMMA Polymer"; Journal of University of Kerbala, The International $3^{rd}$ Scientific Conference of the College of Science; 2015; pp. 17-23.
"Chemical Information Profile for Indium Tin Oxide"; National Toxicology Program; Jun. 2009; pp. 1-28.
Althues, H. et al.; "Functional inorganic nanofillers for transparent polymers"; Chemical Society Reviews; Mar. 2007; pp. 1454-1465.
Wypych, George; "Sources of Fillers, Their Chemical Composition, Properties, and Morphology"; Handbook of Fillers, $2^{nd}$ Edition; 2000; pp. 19-177.
Reis, Joao Carlos R. et al.; "Refractive Index of Liquid Mixtures: Theory and Experiment"; ChemPhysChem; 2010; pp. 3722-3733.
"UNIPLEX 988 and UNIPLEX 988S" Technical Information: Lanxess Deutschland GmbH; 2012; pp. 2.
"BUTVAR polyvinyl butyral resin—Properties and uses" Technical Information; 2013; pp. 1-29.
parchem.com, cinnamaldehyde, 2017, obtain from www.parchem.com/cinnamaldehyde-getpdf-011158.aspx.
parchem.com, Dipropylene Glycol Dibenzoate, 2017, obtained from http://www.parchem.com/chemical-supplier-distributor/Dipropylene-Glycol-Dibenzoate-012292.aspx.
Co-pending U.S. Appl. No. 14/299,945, filed Jun. 9, 2014, Jun Lu, et al.; now U. S. Publication No. 2014-0363651.
Co-pending U.S. Appl. No. 14/300,612, filed Jun. 10, 2014, Jun Lu; now U.S. Pat. No. 9,248,626.
Co-pending U.S. Appl. No. 14/973,547, filed Dec. 17, 2015, Jun Lu.; now U.S. Pat. No. 9,636,894.
Co-pending U.S. Appl. No. 15/474,105, filed Mar. 30, 2017, Jun Lu; now U. S. Publication No. 2017-0232719.
Co-pending U.S. Appl. No. 14/299,975, filed Jun. 9, 2014, Jun Lu, et al.; now U. S. Publication No. 2014-0363652.
Co-pending U.S. Appl. No. 14/299,996, filed Jun. 9, 2014, Jun Lu, et al.; now U.S. Pat. No. 9,254,625.
Co-pending U.S. Appl. No. 14/973,500, filed Dec. 17, 2015, Lu et al.; now U.S. Pat. No. 9,592,653.
Co-pending U.S. Appl. No. 15/438,243, filed Feb. 21, 2017, Lu et al.; now U. S. Publication No. 2017-0157905.
Co-pending U.S. Appl. No. 14/563,347, filed Dec. 8, 2014; Jun Lu and Yalda Farhoudi; now U.S. Pat. No. 9,586,386.
Co-pending U.S. Appl. No. 15/428,557, filed Feb. 9, 2017, Jun Lu and Yalda Farhoudi; now U. S. Publication No. 2017-0151763.

(56) References Cited

OTHER PUBLICATIONS

Co-pending U.S. Appl. No. 14/563,352, filed Dec. 8, 2014, Zhou Li, et al.; now U. S. Publication No. 2016-0160026.
Co-pending U.S. Appl. No. 14/563,359, filed Dec. 8, 2014, Jun Lu, et al.; now U. S. Publication No. 2016-0160033.
Co-pending U.S. Appl. No. 14/563,364, filed Dec. 8, 2014, Jun Lu, et al.; now U.S. Pat. No. 9,522,517.
Co-pending U.S. Appl. No. 15/376,849, filed Dec. 13, 2016; Lu and Li; now U. S. Patent Publication No. 2017-0087813.
Co-pending U.S. Appl. No. 14/563,372, filed Dec. 8, 2014, Jun Lu, et al.; now U.S. Pat. No. 9,586,387.
Co-pending U.S. Appl. No. 15/427,798, filed Feb. 8, 2017; Jun Lu et al.; now U. S. Publication No. 2017-0144415.
Co-pending U.S. Appl. No. 14/563,373, filed Dec. 8, 2014, Jun Lu, et al.; now U.S. Pat. No. 9,573,329.
Copending U.S. Appl. No. 15/246,810, filed Aug. 25, 2016; Jun Lu et al.; now U. S. Patent Publication No. 2016-0361899.
Co-pending U.S. Appl. No. 15/427,844, filed Feb. 8, 2017; Lu and Li; now U. S. Publication No. 2017-0144414.
Co-pending U.S. Appl. No. 14/514,641, filed Oct. 15, 2014, Jun Lu; now U.S. Pat. No. 9,355,631.
Co-pending U.S. Appl. No. 14/882,317, filed Oct. 13, 2015, Jun Lu, et al.; now U.S. Pat. No. 9,809,010.
Co-pending U.S. Appl. No. 15/051,222, filed Feb. 23, 2016, Jun Lu; now U.S. Pat. No. 9,460,702.
Copending U.S. Appl. No. 15/248,502, filed Aug. 26, 2016; Jun Lu; now U.S. Pat. No. 9,576,568.
Copending U.S. Appl. No. 15/729,959, filed Oct. 11, 2017; Lu and Chen.
Co-pending U.S. Appl. No. 14/505,247, filed Oct. 2, 2014, Jun Lu; now U. S. Publication No. 2016-0096350.
Co-pending U.S. Appl. No. 14/563,378, filed Dec. 8, 2014, Jun Lu, et al.; now U.S. Pat. No. 9,815,976.
Co-pending U.S. Appl. No. 15/805,360, filed Nov. 7, 2017; Jun Lu, et al.
Co-pending U.S. Appl. No. 14/563,622, filed Dec. 8, 2014, Jun Lu, et al.; now U.S. Pat. No. 9,809,009.
Co-pending U.S. Appl. No. 15/729,937, filed Oct. 11, 2017; Lu, et al.
Co-pending U.S. Appl. No. 14/563,719, filed Dec. 8, 2014, Jun Lu, et al.; now U.S. Pat. No. 9,809,006.
Co-pending U.S. Appl. No. 15/728,822, filed Oct. 10, 2017; Lu and Chen.
Co-pending U.S. Appl. No. 15/799,451, filed Oct. 31, 2017; Lu and Chen.
Co-pending U.S. Appl. No. 14/563,011, filed Dec. 8, 2014, Jun Lu; now U. S. Publication No. 2016-0159041.
Co-pending U.S. Appl. No. 14/563,381, filed Dec. 8, 2014, Jun Lu, et al.; now U.S. Pat. No. 9,809,695.
Co-pending U.S. Appl. No. 15/051,183, filed Feb. 23, 2016, Spangler et al.; now U. S. Publication No. 2016-0168353.
Notification of Transmittal of the International Search Report and the Written Opinion of the International Searching Authority, or the Declaration dated Jan. 22, 2015 for International Application No. PCT/US2014/041689.
Notification of Transmittal of the International Search Report and the Written Opinion of the International Searching Authority, or the Declaration dated Aug. 29, 2014 for International Application No. PCT/US2014/041698.
Notification of Transmittal of the International Search Report and the Written Opinion of the International Searching Authority, or the Declaration dated Jan. 26, 2016 for International Application No. PCT/US2015/063907.
Notification of Transmittal of the International Search Report and the Written Opinion of the International Searching Authority, or the Declaration dated May 23, 2016 for International Application No. PCT/US2015/063908.
Notification of Transmittal of the International Search Report and the Written Opinion of the International Searching Authority, or the Declaration dated Jan. 26, 2016 for International Application No. PCT/US2015/063885.
Notification of Transmittal of the International Search Report and the Written Opinion of the International Searching Authority, or the Declaration dated Jan. 7, 2016 for International Application No. PCT/US2015/055633.
Notification of Transmittal of the International Search Report and the Written Opinion of the International Searching Authority, or the Declaration dated Nov. 19, 2015 for International Application No. PCT/US2015/051591.
Notification of Transmittal of the International Search Report and the Written Opinion of the International Searching Authority, or the Declaration dated Nov. 19, 2015 for International Application No. PCT/US2015/051593.
Notification of Transmittal of the International Search Report and the Written Opinion of the International Searching Authority, or the Declaration dated Apr. 18, 2016 for International Application No. PCT/US2015/063933.
Notification of Transmittal of the International Search Report and the Written Opinion of the International Searching Authority, or the Declaration dated Mar. 29, 2016 for International Application No. PCT/US2015/063944.
Notification of Transmittal of the International Search Report and the Written Opinion of the International Searching Authority, or the Declaration dated Jan. 26, 2016 for International Application No. PCT/US2015/063975.
Notification of Transmittal of the International Search Report and the Written Opinion of the International Searching Authority, or the Declaration dated Jul. 1, 2016 received in International Application No. PCT/US2015/063900.
Notification of Transmittal of the International Search Report and the Written Opinion of the International Searching Authority, or the Declaration dated May 9, 2017 received in International Application No. PCT/US2017/016898.
Mackey, Randy; "The Physics of Windshield Repair"; Glass Magazine; 2 pages; Jan. 1, 2007.
Co-pending U.S. Appl. No. 15/914,322, filed Mar. 7, 2018, Jun Lu and Wenjie Chen; now U. S. Publication No. 2018-0194120.
Co-pending U.S. Appl. No. 15/863,321, filed Jan. 5, 2018; Zhou Li; now U.S. Pat. No. 9,988,525.
Co-pending U.S. Appl. No. 15/987,335, filed May 24, 2018; Zhou Li; now U. S. Publication No. 2018-0265688.
Co-pending U.S. Appl. No. 15/886,122, filed Feb. 1, 2018; Jun Lu; now U. S. Publication No. 2018-0154618.
Co-pending U.S. Appl. No. 16/164,880, filed Oct. 19, 2018; Lu and Li; now U. S. Publication No. 2019-0047271.
Co-pending U.S. Appl. No. 15/929,112, filed Mar. 20, 2019; Jun Lu.
Co-pending U.S. Appl. No. 16/455,959, filed Jun. 28, 2019; Jun Lu.
Co-pending U.S. Appl. No. 15/984,854, filed May 21, 2018; Jun Lu et al.; now U. S. Publication No. 2018-0272662.
Pub Chem; Di(2-ethylhexyl) phthalate; May 2019, obtained from https://pubchem.ncbi.nlm.nih.gov/compound/dehp (Year: 2019).
Pub Chem; Diisononyl phthalate; May 2019, obtained from https://pubchem.ncbi.nlm.nih.gov/compound/diisonoyl_phthalate (Year: 2019).
BASF; Hexamoll DINCH; Feb. 2015, obtained from http://www.weichmacher.basf.com/portal/load/fid247491/TI_Hexamoll_DINCH_20170705.pdf (Year: 2015).
Sigma-Aldrich; Di(propylene glycol) dibenzoate; May 2019, obtained from https://www.sigmaaldrich.com/catalog/product/aldrich/597236?lang=en&region=US (Year: 2019).
ChemicalBook.com, Triethylene Glycol Di(2-Ethylbutyrate), 2017, obtained from https://www.chemicalbook.com/ChemicalProductProperty_EN_CB2506304.htm (Year: 2017).
Abrisa Technologies, Specialty Glass Products Technical Reference Document, Mar. 27, 2013, obtained from https://web.archive.org/web/20130327162334/https://abrisatechnologies.com/docs/AT%20Specialty%20Glass%20Technical%20Capabilities%20Brochure.pdf (Year: 2013).
Co-pending U.S. Appl. No. 16/455,959, filed Jun. 28, 2019; Jun Lu; now U.S. Pat. No. 10,553,949.

MULTIPLE LAYER INTERLAYER RESISTING DEFECT FORMATION

CROSS REFERENCE TO RELATED APPLICATION(S)

This application is a continuation of U.S. patent application Ser. No. 14/505,191, filed Oct. 2, 2014, the entire disclosure of which is incorporated by reference herein.

BACKGROUND OF THE INVENTION

1. Field of the Invention

This disclosure is related to the field of polymer interlayers for multiple layer glass panels and multiple layer glass panels having at least one polymer interlayer sheet. Specifically, this disclosure is related to the field of polymer interlayers comprising multiple thermoplastic layers which resist the formation of optical defects.

2. Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications and in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may also give the glass a much higher sound insulation rating, reduce UV and/or IR light transmission, and enhance the aesthetic appeal of the associated window. In regard to the photovoltaic applications, the main function of the interlayer is to encapsulate the photovoltaic solar panels which are used to generate and supply electricity in commercial and residential applications.

In order to achieve the certain property and performance characteristics for the glass panel, it has become common practice to utilize multiple layer or multilayered interlayers. As used herein, the terms "multilayer" and "multiple layers" mean an interlayer having more than one layer, and multilayer and multiple layer may be used interchangeably. Multiple layer interlayers typically contain at least one soft layer and at least one stiff layer. Interlayers with one soft "core" layer sandwiched between two more rigid or stiff "skin" layers have been designed with sound insulation properties for the glass panel. Interlayers having the reverse configuration, that is, with one stiff layer sandwiched between two more soft layers have been found to improve the impact performance of the glass panel and can also be designed for sound insulation. Examples of multiple layer interlayers also include the interlayers with at least one "clear" or non-colored layer and at least one colored layer or at least one conventional layer, e.g., non-acoustic layer, and at least one acoustic layer. Other examples of multiple layer interlayers include interlayers with at least two layers with different colors for aesthetic appeal. The colored layer typically contains pigments or dyes or some combination of pigments and dyes. The layers of the interlayer are generally produced by mixing a polymer resin such as poly(vinyl butyral) with one or more plasticizers and melt processing the mix into a sheet by any applicable process or method known to one of skill in the art, including, but not limited to, extrusion, with the layers being combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

The following offers a simplified description of the manner in which multiple layer glass panels are generally produced in combination with the interlayers. First, at least one polymer interlayer sheet (single or multilayer) is placed between two substrates and any excess interlayer is trimmed from the edges, creating an assembly. It is not uncommon for multiple polymer interlayer sheets or a polymer interlayer sheet with multiple layers (or a combination of both) to be placed within the two substrates creating a multiple layer glass panel with multiple polymer interlayers. Then, air is removed from the assembly by an applicable process or method known to one of skill in the art; e.g., through nip rollers, vacuum bag or another deairing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process, or any other method known to one of ordinary skill in the art such as, but not limited to, autoclaving.

Multilayer interlayers such as a trilayer interlayer having a soft core layer and two stiffer skin layers are commercially available. The stiff skin layers provide handling, processing and mechanical strength of the interlayer; the soft core layer provides acoustic damping property. Glass panels containing these multilayered acoustic interlayers can, under extreme conditions, develop defects commonly known as iceflowers (also known as snowflakes), which initiate in the presence of excessive residual, trapped air in the panels and stress in the glass. Specifically, during the manufacturing process of laminated multiple layer glass panel constructs, air and other gasses often become trapped in the interstitial spaces between the substrates and the interlayer or between the individual layers of the multilayered interlayer when these layers are stacked together to form the multilayered interlayer. As noted above, this trapped air is generally removed in the glazing or panel manufacturing process by vacuum or nip roll de-airing the construct. However, these technologies are not always effective in removing all of the air trapped in the interstitial spaces between the substrates. These pockets of air are particularly evident with mismatched glass (e.g., tempered glass, heat strengthened glass, and thick, annealed glass) and in windshields, where the curvature of the glass generally results in gaps of air. These gaps of air in windshields are commonly referred to as "bending gaps." Additionally, when a bending gap is present during autoclaving, heat and pressure compress the glass to conform to the interlayer and narrow the gap, resulting in high stresses in the glass in the original gap area.

As noted above, the de-airing technologies are not always effective in removing all of the air from the glass panel assembly. As a result, there is residual air present between the glass and interlayer. During autoclaving, the residual air dissolves into the interlayer, mostly in the skin layer, under heat and pressure. The residual air located in the skin layer can move into the core layer or skin-core interphase, and it eventually partitions between skin layer and core layer to reach an equilibrium state. When a large amount of residual air (e.g., excessive residual air) is present in the interlayer, air bubbles can nucleate, especially at high temperatures, as the interlayer becomes soft and is less resistant to the nucleation.

With multilayer acoustic interlayers having a soft core layer sandwiched by two stiffer skin layers, e.g., the soft layer is constrained between two stiffer layers, air bubbles commonly first form within the soft core layer as nucleation favors the less viscous medium. In warm to hot climates, such as during the summer season, the temperature of glass can elevate to 50° C. to 100° C. in the laminated glass installed on buildings and vehicles. At these elevated temperatures, forces due to stresses in glass panels or windshields exert pressure on the glass perpendicularly to their plane and in the opposite direction, pulling the glass panels away from each other in an effort to restore them to their original states. The stress reduces the resistance of the air to nucleate and expand and allows the bubble to grow within the core layer.

Bubbles can also nucleate and expand in the skin layers. Because of the relative higher stiffness of the skin layer at the temperature the bubble nucleates and expands and the larger volume of the layers, the bubble expands spherically. When the bubble further expands, it can expand into the core layer, where the expansion of the bubble becomes less resistant. Regardless of where the bubbles initially form, at elevated temperatures (e.g., 50° C. to 100° C.), the stresses from the bending gap or glass mismatch cause the bubbles to expand in the path of least resistance in random radial directions within the core layer. As the defects continue radial expansion, branches and dendritic-like features form, and give the undesirable optical appearance of iceflowers. Additionally, the formation of iceflowers within the core layer typically leads to a separation between the layers, reducing the structural integrity of the panel.

Accordingly, there is a need in the art for the development of a multilayered interlayer that resists the formation of these optical defects without a reduction in other optical, mechanical, and acoustic characteristics of a conventional multilayered interlayer. More specifically, there is a need in the art for the development of multilayered interlayers having at least one soft core layer that resists air nucleation and expansion to form iceflowers while also having superior acoustic properties.

SUMMARY OF THE INVENTION

Because of these and other problems in the art, described herein, among other things are multilayered interlayers, and more specifically, multilayered interlayers comprising at least one stiff skin or outer layer(s) and a soft core layer(s). In an embodiment, these multilayered interlayers comprise: a first polymer layer (skin layer) comprising plasticized poly(vinyl butyral) resin; a second polymer layer (core layer) comprising a blend of two (or more) plasticized poly(vinyl butyral) resins having different residual hydroxyl content; and optionally, a third polymer layer (skin layer) comprising plasticized poly(vinyl butyral) resin. The second polymer layer is disposed adjacent the first polymer layer. If there are three or more layers, the second polymer layer is disposed between the first polymer layer and the third polymer layer, resulting in two skin layers and a central core layer.

In an embodiment, a polymer interlayer that resists formation of iceflower defects is disclosed, the polymer interlayer comprising: at least one soft layer wherein the soft layer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer; at least one stiffer layer comprising a third poly(vinyl butyral resin) having a third residual hydroxyl content; and a plasticizer, wherein the polymer interlayer has a damping loss factor (η) (as measured by Mechanical Impedance Measurement according to ISO 16940) of at least about 0.15. In embodiments, the difference between the first residual hydroxyl content and the second residual hydroxyl content is at least 4.0 weight percent, or at least 6.0 weight percent.

In embodiments, the second poly(vinyl butyral) resin is present in an amount of from about 5 weight percent to about 45 weight percent, or from about 10 weight percent to about 40 weight percent. In embodiments, the residual hydroxyl content of the third poly(vinyl butyral resin) is the same as the residual hydroxyl content of the first poly(vinyl butyral resin) or the second poly(vinyl butyral resin).

In embodiments, the soft layer of the polymer interlayer has at least one glass transition temperature ($T_g$) less than 15° C. In embodiments, the polymer interlayer has at least two different glass transition temperatures ($T_g$) and the difference between the at least two different glass transition temperatures ($T_g$) is at least 3° C.

In another embodiment, a polymer interlayer that resists formation of iceflower defects is disclosed, the polymer interlayer comprising: at least one soft layer wherein the soft layer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer; at least one stiffer layer comprising a third poly(vinyl butyral) resin having a third residual hydroxyl content; and a plasticizer, wherein the polymer interlayer has a damping loss factor (η) (as measured by Mechanical Impedance Measurement according to ISO 16940) of at least about 0.15, and wherein the second poly(vinyl butyral) resin is present in an amount of from about 5 weight percent to about 45 weight percent. In embodiments, the second poly(vinyl butyral) resin is present in an amount of from about 10 weight percent to about 40 weight percent. In embodiments, the difference between the first residual hydroxyl content and the second residual hydroxyl content is at least 4.0 weight percent, or at least 6.0 weight percent.

In embodiments, the soft layer of the polymer interlayer has at least one glass transition temperature ($T_g$) less than 15° C. In embodiments, the polymer interlayer has at least two different glass transition temperatures ($T_g$) and the difference between at least two different glass transition temperatures ($T_g$) is at least 3° C. In embodiments, the residual hydroxyl content of the third poly(vinyl butyral resin) is the same as the residual hydroxyl content of the first poly(vinyl butyral resin) or the second poly(vinyl butyral resin).

In another embodiment, a polymer interlayer that resists formation of iceflower defects is disclosed, the polymer interlayer comprising: at least one soft layer wherein the soft layer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer; at least one stiffer layer comprising a third poly(vinyl butyral resin) having a third residual hydroxyl content; and a plasticizer, wherein the soft layer of the polymer interlayer has at least two glass transition temperatures ($T_g$) and the difference between the two different glass transition temperatures ($T_g$) is at least 3° C. In embodiments, the difference between the first residual hydroxyl content and the second residual hydroxyl content is at least 4.0 weight percent, or at least 6.0 weight percent.

In embodiments, the second poly(vinyl butyral) resin is present in an amount of from about 5 weight percent to about 45 weight percent, or from about 10 weight percent to about 40 weight percent. In embodiments, one glass transition temperature ($T_g$) of the soft layer of the polymer interlayer is less than 15° C.

A multiple layer panel is also disclosed. The multiple layer panel comprises at least one rigid substrate, and a polymer interlayer or multiple layer polymer interlayer as disclosed herein. The panel has improved optical properties.

A method of making a polymer interlayer is also disclosed, wherein the multilayer interlayer comprises a polymer interlayer that resists formation of iceflower defects is disclosed, the polymer interlayer comprising: at least one soft layer wherein the soft layer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer; at least one stiffer layer comprising a third poly(vinyl butyral resin) having a third residual hydroxyl content; and a plasticizer, wherein the polymer interlayer has improved properties, as disclosed herein.

In certain embodiments, the rigid substrate (or substrates) is glass.

DESCRIPTION OF THE PREFERRED EMBODIMENT(S)

Described herein, among other things, are multilayer interlayers comprised of at least one soft core layer, at least one stiff skin layer, and wherein the soft core layer comprises a mixture of at least a first resin and a second resin, wherein the residual hydroxyl content (measured as % PVOH by weight) in the second resin is higher than that in the first resin (or stated differently, where the two resins have different residual hydroxyl contents). The interlayers of present disclosure resist or eliminate iceflower defect formation.

Also described are multiple layer glass panels comprising the interlayers. Mixing two or more resins having different levels of residual hydroxyl content and a plasticizer to form the core layer of the multilayer interlayer, or in other words, adding a second resin (having a different or higher residual hydroxyl content) to the first resin to form the core layer of the multilayer interlayer, improves the resistance of the core layer to bubble nucleation and expansion, which is inherently weak in the conventional multilayered interlayers, thereby effectively reducing or eliminating the iceflower optical defects common with the conventional multilayered interlayer without sacrificing other favorable/desired characteristics of conventional multilayered interlayers such as sound insulation, optical properties, and mechanical strength of the glass panels made with the multilayered interlayers. The multilayer interlayers of the present invention can be used in multiple layer glass applications, such as safety glass in windshields, side windows, and roof and architectural windows.

Conventional multilayer interlayers such as a trilayer acoustic interlayer contain a soft core layer consisting of a single poly(vinyl butyral) ("PVB") resin having a low residual hydroxyl content and a high amount of a plasticizer, and two stiff skin layers having significantly higher residual hydroxyl content (see, for example U.S. Pat. Nos. 5,340,654, 5,190,826, and 7,510,771). The residual hydroxyl content in the PVB core resin and the amount of the plasticizer are optimized such that the interlayer provides optimal sound insulation property under ambient conditions for multiple layer glass panels such as windshields and windows installed on vehicles and buildings. Because of the low residual hydroxyl content of the resin and high level of plasticization, the core layer is soft or has weak mechanical strength and is highly susceptible to iceflower defect formation. Surprisingly, it has been discovered that adding a second PVB resin (having a different or higher residual hydroxyl content than the first PVB resin) to the core layer results in a multiple layer interlayer that reduces or eliminates iceflower defect formation while maintaining the sound insulation property of the conventional multilayered acoustic interlayer. The second PVB resin has a residual hydroxyl content that is at least about 2 wt. % higher than the residual hydroxyl content of the first PVB resin, or at least about 4 wt. % higher, or at least about 6 wt. % higher, or at least about 8 wt. % higher, or at least about 10 wt. % higher, or at least about 12 wt. % higher, or at least about 14 wt. % higher than the residual hydroxyl content of the first PVB resin. Either resin may be designated as the "first" or "second" PVB resin. If the first PVB resin has a relatively higher residual hydroxyl content, then the residual hydroxyl content of the second PVB resin will be at least about 2 wt. % lower than the residual hydroxyl content of the first PVB resin. Stated differently, it is important that the difference between the residual hydroxyl content of the two resins is at least about 2 wt. %, or at least about 4 wt. %, or at least about 6 wt. %, or at least about 8 wt. %, or at least about 10 wt. %, or at least about 12 wt. %, or at least about 14 wt. %.

To modify the conventional multilayer acoustic interlayer according to present disclosure, the first polymer resin in the core layer is selected to provide optimal sound insulation properties and the second polymer resin is selected to provide strength to the core layer to resist iceflower defect formation. Because the plasticizer will generally partition such that there is more plasticizer in the PVB resin having lower residual hydroxyl content and less plasticizer in the PVB resin having higher residual hydroxyl content, the total amount of plasticizer required for the core layer can be reduced accordingly without changing the amount of the plasticizer necessary to plasticize the first resin and to provide the desired sound insulation properties. Consequently, the core layer will exhibit two different glass transition temperatures, with one corresponding to the plasticized first resin (which is the same as the glass transition temperature the core layer of the conventional multilayer interlayer), and the second, higher glass transition temperature corresponding to the plasticized second resin. As a result, the core layer in the multilayer acoustic interlayer is now stronger than that in the conventional multiplayer acoustic interlayer due to the addition of a second polymer resin of higher residual hydroxyl content and reduced overall plasticizer content in the core layer (such that there is a difference between the residual hydroxyl contents of the two resins of at least 2 wt. %).

Multilayer acoustic interlayer such as a trilayer can now be designed by: (1) mixing a second polymer resin of higher residual hydroxyl content with the first polymer resin having the lower hydroxyl content in the core layer, (2) reducing the overall core layer plasticizer content, (3) maintaining plasticizer equilibrium between the core layer and two skin layers and between the first resin and the second resin in the core layer, and (4) combining the core layer and skin layers to form a multilayer interlayer by applicable processes such as co-extrusion or lamination. The resultant multilayer acoustic interlayer reduces or eliminates iceflower defect formation without sacrificing other favorable/desired characteristics of conventional multilayered interlayers, for example, sound insulation properties, optical properties, and mechanical strength of the glass panels made with the multilayered acoustic interlayer.

Prior to discussing the addition of the specific second polymer resin to the core layer to produce the improved interlayer that resists iceflower defect formation, some terminology as well as common components found in an interlayer, both generally and in interlayers of the present disclosure, and the formation thereof, will be discussed. The terms "polymer interlayer sheet," "interlayer," and "polymer melt sheet" as used herein, generally may designate a single-layer sheet or a multilayered interlayer. A "single-layer sheet," as the name implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; a combination of a single-layer sheet and a plural-layer sheet; and a combination of at least one plural-layer sheet and at least one co-extruded sheet. In various embodiments of the present disclosure, a multilayered interlayer comprises at least two polymer layers (e.g., a single layer or multiple layers co-extruded and/or laminated together) disposed in direct contact with each other, wherein each layer comprises a polymer resin, as detailed more fully below. As used herein for multilayer interlayers having at least three layers, "skin layer" generally refers to the outer layers of the interlayer and "core layer" generally refers to the inner layer(s). Thus, one exemplary embodiment would be: skin layer//core layer//skin layer.

The PVB resin is produced by known acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc., a wholly owned subsidiary of Eastman Chemical Company.

As used herein, residual hydroxyl content (calculated as % vinyl alcohol or % PVOH by weight) in PVB refers to the amount of hydroxyl groups remaining on the polymer chains after processing is complete. For example, PVB can be manufactured by hydrolyzing poly(vinyl acetate) to poly (vinyl alcohol (PVOH), and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl hydroxyl groups) as side groups on the polymer chain. As used herein, residual hydroxyl content and residual acetate content is measured on a weight percent (wt. %) basis per ASTM D1396.

In various embodiments, the first PVB resin comprises about 7 to about 16 weight percent (wt. %) hydroxyl groups calculated as % PVOH, about 7 to about 14 wt. %, about 9 to about 14 wt. %, and for certain embodiment, about 11 to about 13 wt. % hydroxyl groups calculated as % PVOH. The resin can also comprise less than 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, or a 2-ethyl hexanal acetal group, or a mix of any two of butyraldehyde acetal, isobutyraldehyde, and 2-ethyl hexanal acetal groups. The second resin comprises about 9 to about 35 wt. %, about 12 to about 35 wt. %, about 15 to about 25 wt. %, and for certain embodiments, about 16 to about 22 wt. % hydroxyl groups calculated as % PVOH. The resin can also comprise less than 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, a 2-ethyl hexanal acetal group, or a mix of any two of butyraldehyde acetal, isobutyraldehyde acetal, and 2-ethyl hexanal acetal groups. The second resin is selected such that the resin has a residual hydroxyl content that is at least about 2 wt. % higher (or different) than the residual hydroxyl content of the first PVB resin, or at least about 4 wt. % higher, or at least about 6 wt. % higher, or at least about 8 wt. % higher, or at least about 10 wt. % higher, or at least about 12 wt. % higher, or at least about 14 wt. % higher than the residual hydroxyl content of the first PVB resin. This difference between the first resin and the second resin is calculated by subtracting the residual hydroxyl content of the first resin with the lower residual hydroxyl content from the residual hydroxyl content of the second resin with the greater residual hydroxyl content. For example, if a first resin has a residual hydroxyl content of 12 wt. %, and a second polymer sheet has a residual hydroxyl content of 15 wt. %, then the residual hydroxyl contents of the two resins differ by 3 wt. %, or the residual hydroxyl content in the second resin is 3 wt. % higher than the residual hydroxyl content in the first resin.

In various embodiments, where the interlayer is a multilayer interlayer such as a trilayer, the residual hydroxyl contents of the PVB resins used in the stiff (or skin) layer(s) is at least 2 wt. %, or at least 4 wt. %, or at least 6 wt. %, or at least 8 wt. %, or at least by 10 wt. % greater than the residual hydroxyl content of the first resin in the core layer, and the resin in the skin layer can comprise about 15 to about 35 wt. %, about 15 to about 30 wt. %, or about 17 to about 22 wt. %; and, for certain embodiments, about 17.25 to about 22.25 wt. % residual hydroxyl groups calculated as %

PVOH. In various embodiments, the residual hydroxyl content of the second resin in the core layer can be the same as, greater than or less than the residual hydroxyl content of the resin in the skin layer. In various embodiments, the first resin, the second resin for the core layer, or the resin for the stiff layer(s), or any two of these resins, or all of the resins can also comprise less than 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde, a 2-ethyl hexanal acetal group, or a mix of any two of butyraldehyde acetal, isobutyraldehyde, and 2-ethyl hexanal acetal groups, as previously discussed.

The amount of the second resin relative to the first resin can vary in any range, as desired, such as from 1 to 99 wt. %, 5 to 95 wt. %, 10 to 90 wt. %, 15 to 85 wt. %, 20 to 80 wt. %, 25 to 75 wt. %, or about 50 wt % of each in the core layer. The amount of the second resin may be any amount, from about 1 wt. % up to about 99 wt. %, depending on the desired properties. In certain embodiments, the amount of the second resin varies from about 5 to about 45 wt. %, in other embodiments, the second resin varies from 10 to 45 wt. %, or from about 10 to about 40 wt. %, or from about 10 to about 35 wt. %. In particularly useful embodiments, the second resin varies from about 10 to about 40 wt. % in the core layer.

The PVB resin (or resins) of the present disclosure typically has a molecular weight of greater than 50,000 Daltons, or less than 500,000 Daltons, or about 50,000 to about 500,000 Daltons, or about 70,000 to about 500,000 Daltons, or about 100,000 to about 425,000 Daltons, as measured by size exclusion chromatography using low angle laser light scattering. As used herein, the term "molecular weight" means the weight average molecular weight.

Various adhesion control agents ("ACAs") can be used in the interlayers of the present disclosure to control the adhesion of the interlayer sheet to glass. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis (2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride (LaB$_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

In various embodiments, the plasticizer is selected from conventional plasticizers or a mixture of two or more conventional plasticizers. In some embodiments, the conventional plasticizer, which has refractive index of about 1.450 or less, may include, for example, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, dibutyl sebacate, dioctyl sebacate, di(butoxyethyl) adipate, bis(2-(2-butoxyethoxy)ethyl) adipate, and mixtures thereof. In some embodiments, the conventional plasticizer is 3GEH (Refractive index=1.442 at 25° C.).

In some embodiments, other plasticizers known to one skilled in the art may be used, such as a plasticizer with a higher refractive index may be used (i.e., a high refractive index plasticizer). As used herein, a "high refractive index plasticizer" is a plasticizer having a refractive index of at least about 1.460. As used herein, the refractive index (also known as index of refraction) of a plasticizer or a resin used in the entirety of this disclosure is either measured in accordance with ASTM D542 at a wavelength of 589 nm and 25° C. or reported in literature in accordance with the ASTM D542.

Examples of plasticizers having a high refractive index that may be used include, but are not limited to, polyadipates (RI of about 1.460 to about 1.485); epoxides (RI of about 1.460 to about 1.480); phthalates and terephthalates (RI of about 1.480 to about 1.540); benzoates (RI of about 1.480 to about 1.550); and other specialty plasticizers (RI of about 1.490 to about 1.520). Examples of high refractive index plasticizers include, but are not limited to, esters of a polybasic acid or a polyhydric alcohol, polyadipates, epoxides, phthalates, terephthalates, benzoates, toluates, mellitates and other specialty plasticizers, among others. Examples of suitable high refractive index plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof.

In various embodiments of interlayers of the present disclosure, the interlayer comprises greater than 5 phr, about 5 to about 120 phr, about 10 to about 90 phr, about 20 to about 70 phr, about 30 to about 60 phr, or less than 120 phr, or less than 90 phr, or less than 60 phr, or less than 40 phr, or less than 30 phr total plasticizer. While the total plasticizer content is indicated above, the plasticizer content in the skin layer(s) or core layer(s) can be different from the total plasticizer content. In addition, the skin layer(s) and core layer(s) can have different plasticizer types and plasticizer contents, in the ranges previously discussed, as each respective layer's plasticizer content at the equilibrium state is determined by the layer's respective residual hydroxyl contents, as disclosed in U.S. Pat. No. 7,510,771 (the entire disclosure of which is incorporated herein by reference). For example, at equilibrium the interlayer could comprise two skin layers, each with 30 phr plasticizer, and a core layer with 65 phr plasticizer, for a total plasticizer amount for the interlayer of about 45.4 phr when the combined skin layer thickness equals that of the core layer. For thicker or thinner skin layers, the total plasticizer amount for the interlayer would change accordingly. In various embodiments of the present invention, the plasticizer content of the core layer and skin layer differs by at least 8 phr, or at least 9 phr, or at least 10 phr, or at least 12 phr, or at least 13 phr, or at least 14 phr, or at least 15 phr, or at least 16 phr, or at least 17 phr, or at least 18 phr, or at least 19 phr, or at least 20 phr, or at least 25 phr or more. As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the mix or melt that was used to produce the interlayer.

The amount of plasticizer in the interlayer can be adjusted to affect the glass transition temperature ($T_g$). The glass transition temperature ($T_g$) is the temperature that marks the transition from the glassy state of the interlayer to the rubbery state. In general, higher amounts of plasticizer loading will result in lower $T_g$. Conventional, previously utilized interlayers generally have had a $T_g$ in the range of about −10 to 25° C. for acoustic (noise reducing) interlayers, and up to about 45° C. for hurricane and aircraft (stiffer or structural) interlayer applications.

In various embodiments, the core layer of the interlayers of the present disclosure has multiple glass transition temperatures. For example, the $T_g$ of the first plasticized resin may be about −40° C. to about 15° C., or about 15° C. or less, or about 10° C. or less, or about −20° C. to 10° C., and the $T_g$ of the second plasticized resin may be about 0 to 45° C., about 0° C. or greater, about 5° C. or greater, about 10° C. or greater, about 15° C. or greater, or in certain embodiments, about 15 to about 40° C., or about 45° C. or less, or about 40° C. or less, or about 35° C. or less. In various embodiments, the $T_g$ of the second plasticized resin is at least about 3° C. greater than the $T_g$ of the first plasticized resin, or about 4° C. greater, or about 5° C. greater, or about 6° C. greater, or about 7° C. greater, or about 8° C. greater, or about 9° C. greater, or about 10° C. greater, or about 15° C. greater, or about 25° C. greater, or about 35° C. greater than the $T_g$ of the first plasticized resin, and for certain embodiments, the $T_g$ of the second plasticized resin may be about 16° C. to about 35° C. In some embodiments, the glass transition of the second plasticized resin may be obscured by the glass transition of the first plasticized resin such that it does not exhibit a distinctive glass transition temperature, the $T_g$ of the second plasticized resin in the core layer is determined from the $T_g$ of the plasticized second resin prior to mixing with the first resin.

The final interlayer, whether formed from extrusion or co-extrusion, generally has a random rough surface topography as it is formed through melt fractures of polymer melt as it exits the extrusion die and may additionally be embossed over the random rough surface on one or both sides (e.g., the skin layers) by any method of embossment known to one of ordinary skill in the art.

While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate of the present invention are formed using lamination processes known in the art.

Generally, the thickness, or gauge, of the polymer interlayer sheet will be in a range from about 15 mils to 100 mils (about 0.38 mm to about 2.54 mm), about 15 mils to 60 mils (about 0.38 mm to about 1.52 mm), about 20 mils to about 50 mils (about 0.51 to 1.27 mm), and about 15 mils to about 35 mils (about 0.38 to about 0.89 mm). In various embodiments, each of the layers, such as the skin and core layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm).

Although the embodiments described below refer to the polymer resin as being PVB, it would be understood by one of ordinary skill in the art that the polymer may be any polymer suitable for use in a multiple layer panel. Typical polymers include, but are not limited to, polyvinyl acetals (PVA) (such as poly(vinyl butyral) (PVB) or isomeric poly (vinyl isobutyral (PVisoB)), polyurethane (PU), poly(ethylene-co-vinyl acetate) (EVA), polyvinylchloride (PVC), poly (vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB and its isomeric polymer poly(vinyl isobutyral) (PVisoB), polyvinyl chloride, and polyurethane are particularly useful polymers generally for interlayers; PVB (and its isomeric polymer) is particularly preferred. For example, the multilayered interlayer can consist of PVB//PVisoB//PVB. Other example includes PVB//PVC//PVB or PVB//PU//PVB. Further examples include PVC//PVB//PVC or PU//PVB//PU. Alternatively, the skin and core layers may all be PVB using the same or different starting PVB resins.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.2 mm thick.

The interlayers of the present disclosure will most commonly be utilized in multiple layer panels comprising two substrates, such as a pair of glass sheets (or other rigid materials, such as polycarbonate or acrylic, known in the art), with the interlayers disposed between the two substrates. An example of such a construct would be: (glass)//(polymer interlayer sheet)//(glass), where the polymer interlayer sheet can comprise multilayered interlayers, as noted above, and wherein the core layer of the multilayer interlayer comprises a first resin and a second resin having higher residual hydroxyl content and at least one such that a multiple layer panel that resists iceflower defect formation is created. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 180 psig and 200 psig for about 30 to 90 minutes. The actual steps, as well as the times and temperatures, may vary as necessary, as known by one skilled in the art.

Other means for use in de-airing of the interlayer-glass interfaces (steps 2-5) known in the art and that are commercially practiced include vacuum bag and vacuum ring processes in which a vacuum is utilized to remove the air.

As previously indicated, clarity is a parameter used to describe the polymer interlayers disclosed herein. Clarity is determined by measuring the haze value or percent haze. The test for percent haze is performed with a hazemeter, such as Model D25 available from Hunter Associates (Reston, Va.), and in accordance with ASTM D1003-61 (Reapproved 1977)-Procedure A using Illuminant C, at an observer angle of 2 degrees. The polymer interlayers are laminated with a pair of clear glass sheets each of 2.3 mm thick (commercially available from Pittsburgh Glass Works of Pennsylvania) and the haze values are measured. The interlayers of the present disclosure have a percent haze of less than about 5%, less than about 4%, less than about 3%, less than about 2%, less than about 1%, or less than about 0.5%.

Transparency, or percent visual transmittance (% $T_{vis}$) is also used to describe the polymer interlayers disclosed herein. The transparency is also measured with a hazemeter, such as Model D25 available from Hunter Associates (Reston, Va.), and in Illuminant D65, at an observer angle of 10 degrees. The polymer interlayers are laminated with a pair of clear glass sheets each of 2.3 mm thick (commercially available from Pittsburgh Glass Works of Pennsylvania) and the % $T_{vis}$ is measured. The polymer interlayers of the present disclosure have a % $T_{vis}$ of greater than 85 for the interlayers containing only additives of ACAs, UV stabilizers, and antioxidant, or greater than 80% for the interlayers containing additional additives such as pigments, IR absorbers or blockers as mentioned above. Polymer interlayers containing high levels of pigments and/or dyes may have lower % $T_{vis}$ values as desired, such as in mass pigmented or colored polymer interlayers.

The refractive index (RI) was measured in accordance with ASTM D542. The reported RI values were obtained at a wavelength of 589 nm and at 25° C.

The glass transition temperature ($T_g$) was determined by dynamical mechanical thermal analysis (DMTA). The DMTA measures the storage (elastic) modulus (G') in Pascals, loss (viscous) modulus (G") in Pascals, tan delta (=G"/G') of the specimen as a function of temperature at a given frequency, and temperature sweep rate. A frequency of 1 Hz and temperature sweep rate of 3° C./min were used herein. The $T_g$ is then determined by the position of the tan delta peak on the temperature scale in ° C.

The damping loss factor ($\eta$) was measured by Mechanical Impedance Measurement as described in ISO 16940. A laminated glass bar sample of 25 mm wide, 300 mm long, and having a pair of 2.3 mm clear glass is prepared and excited at the center point of the bar by a vibration shaker (Brüel and Kjær). An impedance head (Brüel and Kjær) is used to measure the force to excite the bar to vibrate and the velocity of the vibration and the resultant transfer function is recorded on a National Instrument data acquisition and analysis system. The loss factor at the first vibration mode is calculated using the half-power method.

"Sound transmission loss" (STL) is determined for a laminate of the present invention or comparative panel of fixed dimensions with ASTM E90 (2009) at a fixed temperature of 20° C. A "Reference Panel" of 2.3 mm clear glass//"Reference interlayer"//2.3 mm clear glass is measured to have a coincident frequency at 3,150 Hz and STL of 31 dB at the coincident frequency, wherein the "Reference Interlayer" is produced by mixing and melt-extruding 100 parts poly(vinyl butyral) resin having a residual hydroxyl content of 18 to 19 wt. % and a vinyl acetate residue of 2 wt. %, 38 parts by weight of 3GEH plasticizer, and other common additives (as described above). The reference interlayer has a thickness of 0.76 mm a glass transition temperature of 30° C. The multilayer interlayers of the present invention or the comparative multilayer interlayers are laminated with 2.3 mm clear glass according to the method described above for making the reference (or test) laminated glass panel. The panel has a dimension of 50 cm by 80 cm. The STL of the test panel at the coincident frequency of the "Reference Panel", e.g., STL at 3,150 Hz, is used to assess the sound insulation property of the panel. In various embodiments, the STL of the glass panel comprising the multilayer interlayer of the present invention is greater than about 35 dB, greater than about 36 dB, greater than about 37 dB, greater than about 38 dB, or greater than about 39 dB.

As previously discussed, optical defects known as iceflowers are commonly found in trilayer laminates. The formation of iceflowers in trilayer acoustic PVB laminates can be tested by simulating the real world situation in windshields and other glazings where the combination of large bending gaps and poor de-airing are known to be among the root causes for iceflower development in the field. First, a 30 cm by 30 cm trilayer interlayer with a polyethylene terephthalate (PET) film ring (with an inside diameter of 7.5 cm; an outside diameter of 14 cm; and a thickness of 0.10 mm to 0.18 mm) is placed in the center is sandwiched between two 30 cm by 30 cm pieces of 2.3 mm glass. The construct is then pre-laminated and autoclaved. The resulting laminates are allowed to condition at room temperature for 48 hours, baked in a conventional oven (at 80° C.) for 48 hours, and then allowed to cool. The laminates are then visually inspected to determine the rate of iceflower formation in the laminate (e.g., the percentage of laminates that developed iceflower defects) and the percentage of area within the PET ring with iceflower defects (as disclosed, for example, in U.S. Patent Application Publication 20130236693 A1, the entire disclosure of which is incorporated by reference herein). A total of ten (10) laminates is used to obtain an average value of the rate of iceflower formation for a trilayer interlayer type.

The invention also includes the following Embodiments 1 to 13, set forth below.

Embodiment 1 is a polymer interlayer that resists formation of iceflower defects, the polymer interlayer comprising: at least one soft layer wherein the soft layer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer; at least one stiffer layer comprising a third poly(vinyl butyral resin) having a third residual hydroxyl content; and a plasticizer, wherein the polymer interlayer has a damping loss factor (η) (as measured by Mechanical Impedance Measurement according to ISO 16940) of at least about 0.15.

Embodiment 2 is a polymer interlayer that resists formation of iceflower defects, the polymer interlayer comprising: at least one soft layer wherein the soft layer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer; at least one stiffer layer comprising a third poly(vinyl butyral resin) having a third residual hydroxyl content; and a plasticizer, wherein the soft layer of the polymer interlayer has at least two glass transition temperatures ($T_g$) and the difference between the two different glass transition temperatures ($T_g$) is at least 3° C.

Embodiment 3 is a polymer interlayer including the features of any of embodiments 1 to 2, wherein the second poly(vinyl butyral) resin is present in an amount of from about 5 weight percent to about 45 weight percent.

Embodiment 4 is a polymer interlayer that resists formation of iceflower defects, the polymer interlayer comprising: at least one soft layer wherein the soft layer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer; at least one stiffer layer comprising a third poly(vinyl butyral resin) having a third residual hydroxyl content; and a plasticizer, wherein the polymer interlayer has a damping loss factor (η) (as measured by Mechanical Impedance Measurement according to ISO 16940) of at least about 0.15, and wherein the second poly(vinyl butyral) resin is present in an amount of from about 5 weight percent to about 45 weight percent.

Embodiment 5 is a polymer interlayer including any of the features of embodiments 1 to 4, wherein the second poly(vinyl butyral) resin is present in an amount of from about 10 weight percent to about 40 weight percent.

Embodiment 6 is a polymer interlayer including any of the features of embodiments 1 to 5, wherein the soft layer of the polymer interlayer has at least one glass transition temperature ($T_g$) less than 15° C.

Embodiment 7 is a polymer interlayer including any of the features of embodiments 1 to 6, wherein the residual hydroxyl content of the third poly(vinyl butyral resin) is the same as the residual hydroxyl content of the first poly(vinyl butyral resin) or the second poly(vinyl butyral resin).

Embodiment 8 is a polymer interlayer including any of the features of embodiments 1 to 7, wherein the difference between the first residual hydroxyl content and the second residual hydroxyl content is at least 4.0 weight percent.

Embodiment 9 is a polymer interlayer including any of the features of embodiments 1 to 8, wherein the difference between the first residual hydroxyl content and the second residual hydroxyl content is at least 6.0 weight percent.

Embodiment 10 is a polymer interlayer including any of the features of embodiments 1 or 4, wherein the polymer interlayer has at least two different glass transition temperatures ($T_g$) and the difference between the at least two different glass transition temperatures ($T_g$) is at least 3° C.

Embodiment 11 is a polymer interlayer including any of the features of embodiments 1 to 10, wherein the polymer interlayer has at least two different glass transition temperatures ($T_g$) and the difference between at least two different glass transition temperatures ($T_g$) is at least 5° C.

Embodiment 12 is a multiple layer glass panel including the polymer interlayer of any of embodiments 1 to 11.

Embodiment 13 is a multiple layer glass panel comprising: a first glass panel; a polymer interlayer including any of the features of embodiments 1 to 11, a second glass panel, wherein the polymer interlayer is disposed between the first and second glass panels.

EXAMPLES

Exemplary core layers of the present disclosure (designated as "Disclosed Layers" and as shown as DL 1-8 in Table 1 below) and comparative core layers (designated as "Comparative Layers" and as shown as CL 1-2 in Table 1 below) were produced by mixing and melt-extruding 100 parts poly(vinyl butyral) resins and various amounts of plasticizer, and other common additives (as described above), as shown in Table 1. The core layers depicted in Table 1 were then used to construct various multilayered interlayers as shown in Table 2 and Table 3 and as described more fully below.

The improvements (or reduction) in iceflower defect formation in a multilayer interlayer can be most readily appreciated by a comparison of multilayer (trilayer) interlayers having a blend of two resins of different residual hydroxyl content and at least one plasticizer in the core layer (designated as "Disclosed Interlayers") to a multilayer interlayer having a core layer formed from only a single resin (of a fixed residual hydroxyl content) and at least one plasticizer in the core layer (designated as "Comparative Interlayers"). The Comparative Interlayers are shown as CI-1 to CI-4, and the Disclosed Interlayers are shown as DI-1 to DI-16 in Table 2 and Table 3. These Examples demonstrate that iceflower defects can be significantly reduced or completely eliminated when at least two PVB resins having differing residual hydroxyl contents are used in the core layer, such as when a second PVB resin having a higher residual hydroxyl content is added to (or combined with) a first PVB resin having a lower residual hydroxyl level the core layer.

The resins used in the Tables below are PVB resins having residual hydroxyl contents and vinyl acetate residues as follows:

Resin-A: about 10-11 wt. % residual hydroxyl content and a vinyl acetate residue of 2%.

Resin-B: about 16 wt. % residual hydroxyl content and a vinyl acetate residue of 2%.

Resin-C: about 18-19 wt. % residual hydroxyl content and a vinyl acetate residue of 2%.

Resin-D: about 21-22 wt. % residual hydroxyl content and a vinyl acetate residue of 2%.

The poly(vinyl butyral) resin used in the skin layer(s) in the Examples had about 18-19 wt. % residual hydroxyl content (Resin-C). For the core layers shown in Table 1, the first poly(vinyl butyral) resin used in the core layer had about 10-11 wt. % residual hydroxyl content (Resin-A), and the residual hydroxyl content of the second resin used in the core layer varied (Resin-B, Resin-C or Resin-D) as shown in Table 1. Core layers were produced according to the above procedure using a combination of first and second PVB resins having different residual hydroxyl contents and a plasticizer (either a conventional plasticizer (3GEH, RI=1.442 at 25° C.) or a high refractive index plasticizer (isodecyl benzoate, RI=1.490 at 25° C.)), as indicated in Table 1 below.

TABLE 1

| Core Layer | Resin-A (parts, wt) | Resin-B (parts, wt) | Resin-C (parts, wt) | Resin-D (parts, wt) | Plasticizer (3GEH) Content in PVB (phr) | Plasticizer (isodecyl benzoate) Content in PVB (phr) | Tg of plasticized Resin-A (° C.) | Tg of plasticized second PVB Resin (° C.) |
|---|---|---|---|---|---|---|---|---|
| CL-1 | 100 | | | | 75 | | −3 | — |
| DL-1 | 95 | | 5 | | 73 | | −3 | 30 |
| DL-2 | 90 | | 10 | | 71 | | −3 | 30 |
| DL-3 | 80 | | 20 | | 68 | | −3 | 30 |
| DL-4 | 65 | | 35 | | 62 | | −3 | 30 |
| DL-5 | 85 | 15 | | | 75 | | −3 | 17 |
| DL-6 | 70 | 30 | | | 75 | | −4 | 16 |
| DL-7 | 55 | 45 | | | 75 | | −5 | 15 |
| CL-2 | 100 | | | | | 78 | −2 | — |
| DL-8 | 95 | | | 5 | | 78 | −2 | 37 |

As shown in Table 1, core layers DL-1 through DL-4 contain a first resin (Resin-A, having residual hydroxyl content of about 10-11 wt. %), a second resin (Resin-C, having a residual hydroxyl content of 18-19 wt. %) in amounts varying from 5 to 35 wt. %, and a plasticizer (3GEH) at levels of 62 to 73 phr. Core layer CL-1 is a control or comparative example having only a first resin (Resin-A) and 75 phr conventional plasticizer (3GEH). Core layers DL-5 to DL-7 contain a first resin (Resin-A, having residual hydroxyl content of about 10-11 wt. %), a second resin (Resin-B, having a residual hydroxyl content of about 16 wt. %) in amounts varying from 15 to 45 wt. %, and a plasticizer (3GEH) at a level of 75 phr. Core layer CL-2 has only a first resin (Resin-A) and 78 phr high refractive index plasticizer (isodecyl benzoate). Core layer DL-8 contains a first resin (Resin-A, having residual hydroxyl content of about 10-11 wt. %), a second resin (Resin-D, having a residual hydroxyl content of about 21-22 wt. %) and a high refractive index plasticizer (isodecyl benzoate) at a level of 78 phr.

As shown in Table 1, the plasticizer level is gradually reduced from 73 phr to 62 phr in core layers DL-1 to DL-4 to account for the plasticizer partitioning between the skin and the core layers as the amount of the second resin is increased. For core layers DL-5 to DL-7, the plasticizer level was held constant at 75 phr. The $T_g$ of the plasticized Resin-A was −3° C. for DL-1 to DL-4, −3 to −5° C. for DL-5 to DL-7, and for DL-8 it was −2° C.

The core layers of Table 1 were then used in multiple layer (trilayer) interlayers as shown in Table 2 below to produce control or comparative interlayers CI-1 to CI-4 and disclosed interlayers DI-1 to DI-16 according the present invention.

The disclosed interlayers DI-1 through DI-12 were all produced using core layers DL-1 to DL-4 (from Table 1), which comprise Resin-A (10-11 wt. % residual hydroxyl content) and a second resin, Resin-C (18-19 wt. % residual hydroxyl content), in varying amounts from 5 wt. % to 35 wt. % (as shown in Table 1). Resin-C was also used to produce the skin layers. The residual hydroxyl content of the second resin (Resin-C) was about 7 to 9 wt. % higher than that of the first resin (and the same as the skin layer resin).

In CI-1 to CI-3 and DI-1 to DI-12, the first resin in the core layer had a plasticizer content of 75 phr, and the second resin in the core layer had a plasticizer content of 38 phr (which is the same amount as in the skin layer of the samples). The core layer thickness ranged from 0.13 mm to 0.51 mm in samples CI-1 to CI-3 and DI-1 to DI-12.

Disclosed interlayers DI-13 though DI-15 were produced using core layers DL-5 to DL-7 (respectively, from Table 1) which comprise Resin-A (10-11 wt. % residual hydroxyl content) and a second resin, Resin-B (16 wt. % residual hydroxyl content), in varying amounts (as shown in Table 1). The residual hydroxyl content of the second resin was about 5 to 6 wt. % higher than that of the first resin and about 3 wt. % lower than that of the resin used in the skin layer (Resin-C). The core layer thickness was 0.13 mm (5 mils). Due to plasticizer partitioning between the first and the second resins in the core layer and between the resins in the core layer and the resin in the skin layers, a new equilibria in the plasticizer partitioning between these resins was reached. At equilibrium, the first resin in the core had about 77 to 81 phr plasticizer (which is higher than the 75 phr plasticizer level in the control sample, CI-3); the second resin in the core had about 50 phr plasticizer and the skin layer resin had about 38 to 39 phr plasticizer.

The disclosed interlayer DI-16 was produced using core layer DL-8 (from Table 1) which comprised Resin-A (10-11 wt. % residual hydroxyl content) and a second resin, Resin-D (21-22 wt. % residual hydroxyl content). Core layer DL-8 contained 5 wt. % of a Resin-D, which is 11 to 12 wt. % higher than the first resin (Resin-A) and 3 to 4 wt. % higher than the resin in the skin layer (Resin-C), and a high refractive index plasticizer. The plasticizer partitioning between the first resin (Resin-A) and the skin resin (Resin-C) in DI-16 is the same as in the comparative interlayer CI-4, which has 100% of Resin-A in the core layer. The plasticizer partitioning between the first and the second core layer resins and between the second resin and the skin layer resin are different from the comparative interlayer CI-4 because the second resin has a different residual hydroxyl content level.

TABLE 2

| Interlayer No. | Skin Layer Resin % OH content (wt. %) | Skin Layer Plasticizer content (phr) | Combined Thickness of Skin Layers 1 and 2 (mm) | Core Layer (from Table 1) | Core layer thickness (mm) | Final plasticizer content in skin layer (phr) | Final plasticizer content in core layer first Resin (phr) | Final plasticizer content in core layer second Resin (phr) | Tg of plasticized first resin in core layer (° C.) | Tg of plasticized second resin in core layer (° C.) |
|---|---|---|---|---|---|---|---|---|---|---|
| CI-1 | 19 | 38 | 0.33 | CL-1 | 0.51 | 38 | 75 | — | −3 | — |
| DI-1 | 19 | 38 | 0.33 | DL-1 | 0.51 | 38 | 75 | 38 | −3 | 30 |
| DI-2 | 19 | 38 | 0.33 | DL-2 | 0.51 | 38 | 75 | 38 | −3 | 30 |
| DI-3 | 19 | 38 | 0.33 | DL-3 | 0.51 | 38 | 75 | 38 | −3 | 30 |
| DI-4 | 19 | 38 | 0.33 | DL-4 | 0.51 | 38 | 75 | 38 | −3 | 30 |
| CI-2 | 19 | 38 | 0.58 | CL-1 | 0.26 | 38 | 75 | — | −3 | 30 |
| DI-5 | 19 | 38 | 0.58 | DL-1 | 0.26 | 38 | 75 | 38 | −3 | 30 |
| DI-6 | 19 | 38 | 0.58 | DL-2 | 0.26 | 38 | 75 | 38 | −3 | 30 |
| DI-7 | 19 | 38 | 0.58 | DL-3 | 0.26 | 38 | 75 | 38 | −3 | 30 |
| DI-8 | 19 | 38 | 0.58 | DL-4 | 0.26 | 38 | 75 | 38 | −3 | 30 |
| CI-3 | 19 | 38 | 0.71 | CL-1 | 0.13 | 38 | 75 | — | −3 | — |
| DI-9 | 19 | 38 | 0.71 | DL-1 | 0.13 | 38 | 75 | 38 | −3 | 30 |
| DI-10 | 19 | 38 | 0.71 | DL-2 | 0.13 | 38 | 75 | 38 | −3 | 30 |
| DI-11 | 19 | 38 | 0.71 | DL-3 | 0.13 | 38 | 75 | 38 | −3 | 30 |
| DI-12 | 19 | 38 | 0.71 | DL-4 | 0.13 | 38 | 75 | 38 | −3 | 30 |
| DI-13 | 19 | 38 | 0.71 | DL-5 | 0.13 | 38 | 77 | 49 | −3 | 19 |
| DI-14 | 19 | 38 | 0.71 | DL-6 | 0.13 | 39 | 80 | 49 | −3 | 19 |
| DI-15 | 19 | 38 | 0.71 | DL-7 | 0.13 | 39 | 81 | 50 | −3 | 19 |
| CI-4 | 19 | 39 | 0.71 | CL-2 | 0.13 | 39 | 78 | — | −2 | — |
| DI-16 | 19 | 39 | 0.71 | DL-8 | 0.13 | 39 | 78 | 34 | −2 | 37 |

The exemplary multilayered interlayers DI-1 to DI-16 and the control or comparative multilayered interlayers CI-1 to CI-4 in Table 2 can be compared to show the improvement of the multilayered interlayers of the present invention in resisting iceflower defect formation when the multilayered interlayers are used in multilayer laminate glass panels. As noted above, the core layers depicted in Table 1 were used to construct various multilayered interlayers as shown in Table 2, with the resultant multilayered interlayer used to construct laminates as shown in Table 3. The multilayered interlayers all have a general construction of skin layer/core layer/skin layer. The total thickness of each of the interlayers used was 0.84 mm. The laminates in Table 3 were each made with two (2) pieces of 2.3 mm clear glass, the interlayer (as shown in Table 3) and a 0.13-mm PET film ring in the center, as described above, along with the interlayer from Table 2 as shown in Table 3. The laminates were then nip rolled for de-airing. The average surface roughness (Rz) for the random rough surface interlayers was approximately 36 microns. The laminates were then tested to determine the amount (measured as the % area) of iceflower defects, Damping Loss Factor (η) at 20° C., % $T_{vis}$, % Haze and Sound Transmission Loss (STL, at the reference frequency of 3150 Hz, in dB). Results are shown in Table 3.

TABLE 3

| Interlayer No. (from Table 2) | Core layer (from Table 1) | Core layer thickness (mm) | Hydroxyl content of the second resin (wt. %) | Type of plasticizer in the interlayer | Area of iceflower defect (%) | Damping loss factor at 20° C. | $T_{vis}$ (%) | Haze (%) | STL at Reference frequency 3,150 Hz (dB) |
|---|---|---|---|---|---|---|---|---|---|
| CI-1 | CL-1 | 0.51 | — | 3GEH | 18 | 0.38 | 88 | 0.3 | 40 |
| DI-1 | DL-1 | 0.51 | 19 | 3GEH | 14 | 0.37 | 86 | 2.1 | N.T. |
| DI-2 | DL-2 | 0.51 | 19 | 3GEH | 6 | 0.38 | 85 | 4.7 | 40 |
| DI-3 | DL-3 | 0.51 | 19 | 3GEH | 2 | 0.40 | 84 | 16 | N.T. |
| DI-4 | DL-4 | 0.51 | 19 | 3GEH | 0 | 0.30 | 83 | 34 | 40 |
| CI-2 | CL-1 | 0.26 | — | 3GEH | 20 | 0.41 | 88 | 0.3 | 40 |
| DI-5 | DL-1 | 0.26 | 19 | 3GEH | 18 | 0.41 | 88 | 0.8 | N.T. |
| DI-6 | DL-2 | 0.26 | 19 | 3GEH | 10 | 0.42 | 87 | 2.1 | 40 |
| DI-7 | DL-3 | 0.26 | 19 | 3GEH | 4 | 0.36 | 85 | 8.3 | N.T. |
| DI-8 | DL-4 | 0.26 | 19 | 3GEH | 0 | 0.25 | 87 | 18 | 39 |
| CI-3 | CL-1 | 0.13 | — | 3GEH | 35 | 0.36 | 88 | 0.3 | 40 |
| DI-9 | DL-1 | 0.13 | 19 | 3GEH | 25 | 0.35 | 88 | 0.4 | N.T. |
| DI-10 | DL-2 | 0.13 | 19 | 3GEH | 10 | 0.31 | 87 | 0.7 | 40 |
| DI-11 | DL-3 | 0.13 | 19 | 3GEH | 6 | 0.29 | 87 | 3 | N.T. |
| DI-12 | DL-4 | 0.13 | 19 | 3GEH | 0 | 0.16 | 87 | 7.5 | 38 |
| DI-13 | DL-5 | 0.13 | 16 | 3GEH | 0.13 | N.T. | N.T. | N.T. | N.T. |
| DI-14 | DL-6 | 0.13 | 16 | 3GEH | 0.13 | N.T. | N.T. | N.T. | N.T. |
| DI-15 | DL-7 | 0.13 | 16 | 3GEH | 0.13 | N.T. | N.T. | N.T. | N.T. |
| CI-4 | CL-2 | 0.13 | — | Isodecyl benzoate | 30 | 0.36 | 88 | 0.3 | 40 |
| DI-16 | DL-8 | 0.13 | 21.0 | Isodecyl benzoate | 5 | 0.35 | 88 | 0.3 | 40 |

N.T. = not tested

Table 3 demonstrates that adding a second resin having higher residual hydroxyl content to a first resin (having a lower residual hydroxyl content) to produce the core layer in the multilayer interlayer results in a significant reduction or even elimination of iceflower defect formation regardless of the core layer thickness. As shown in the Tables, the reduction in iceflower defect formation correlates with the residual hydroxyl content of the second resin. For example, when the second resin has a residual hydroxyl content of 18-19 wt. % (Resin-C), the iceflower defect is eliminated when this resin is present at 35 wt. %. When the second resin has a residual hydroxyl content of 16 wt. %, the iceflower defect can be eliminated when the second resin is present at 45 wt. %. Stated differently, the iceflower defect can be eliminated but more of the second resin having the lower residual hydroxyl level is necessary than the amount of resin needed having the higher residual hydroxyl level.

The effectiveness of the second resin to reduce or eliminate iceflower defects is further shown by comparing the area of iceflower defects in laminates having the same core layer with different core layer thicknesses. For example, comparing DI-1, DI-5 and DI-9, which all have 5 wt. % of Resin-C, as the core layer thickness decreases, the area of iceflower defects increases. But as the amount of Resin-C increases, the level of iceflower defects is reduced. At 35 wt. % Resin-C, the iceflower defects are completely eliminated at all three core layer thicknesses.

All interlayers showed high acoustic damping performance (expressed as damping loss factor ($\eta$) at 20° C.) and sound insulation (expressed as STL at reference frequency of 3,150 Hz). As the core layer was modified and the core layer thickness was varied, the acoustic damping and sound insulation performance also varied. For example, at core thickness levels of 0.51 mm, the damping loss factor ($\eta$) and STL were fairly consistent (or essentially unchanged) at between 0.37 and 0.40 and 40 dB in cores having from 5 to 20 wt. % of Resin-C, while at core thickness levels of only 0.13 mm, the Loss Factor was between 0.29 and 0.35 and STL was between 38 to 40 dB in cores having from 5 to 20 wt. % of Resin-C. At levels of 35 wt. % of the second resin, Resin-C, the damping loss factor ($\eta$) decreased slightly at all thicknesses and STL was fairly consistent. As shown by the data in Table 3 the acoustic performance (damping loss factor ($\eta$)) is strongly dependent on the core layer thickness, and increasing core layer thickness improves the acoustic performance (increases the damping loss factor ($\eta$)).

By adjusting the core thickness, the level of the second PVB resin in the core, and the residual hydroxyl contents of the resins in the skin and core layers, it is possible to design and produce a multilayer interlayer having improved properties (such as reduced levels of iceflower defects) without affecting its acoustic performance or damping loss factor. For example, CI-3 and DI-11 (0.13 mm (5 mils) core layer) have 0 and 20 wt. % of the second resin, Resin-C, respectively, and damping loss factor ($\eta$) of 0.36 and 0.29. Increasing (doubling) the core layer thickness from 0.13 mm (5 mils) to 0.26 mm (10 mils) while keeping the level of the second resin, Resin-C, at 20 wt. %, increases the damping loss factor from 0.29 (DI-11) to 0.36 (DI-7). By increasing the core layer thickness the same acoustic performance (or damping loss factor ($\eta$)) can be achieved for the same resin blend composition. Adding only 5 wt. % of a second, higher residual hydroxyl content PVB resin to the core layer provided a significant reduction in iceflower defect formation without adversely or negatively affecting acoustic damping performance. Therefore, it is possible that an interlayer can be modified by adding to the core layer a PVB resin having a higher residual hydroxyl level to significantly reduce or eliminate iceflower defects without adversely affecting its damping loss factor.

As the plasticizer content was reduced in core layers DL-1 to DL-4 (from 73 phr to 62 phr), the plasticizer content in the first resin remained at 75 phr and the plasticizer partitioned between the first PVB resin in the core layer and the resin in the skin layer (as shown in Table 2) to be the same as in the comparative interlayers CI-1, CI-2, and CI-3. The plasticizer content in the second resin was about 38 phr.

Core layers DL-5 to DL-7 contain a second resin (Resin-B having a residual hydroxyl content of 16 wt. %) at levels of 15, 30 and 45 wt. % respectively, and a plasticizer content of 75 phr. Because of the plasticizer partitioning between the first and second resins in the core, the plasticizer content in the first resin is more than 75 phr and the plasticizer content in the second resin is less than 75 phr. As core layers DL-5 to DL-7 are combined with skin layers (as shown in Table 2), there is a further plasticizer partitioning between the skin layers and the core layer, resulting in plasticizer contents in the skin layers and in the core layer that are different from the amounts originally added.

In conclusion, the multilayered interlayers with core layers described herein have numerous advantages over conventional multilayered interlayers previously utilized in the art. In general, in comparison to multilayered interlayers previously utilized in the art, the multilayered interlayers comprising core layers as described herein have an increased resistance to the formation of iceflower defects common in multiple layer panels without sacrificing other properties, such as acoustic performance or optical properties (such as % Haze and % $T_{vis}$). Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:

1. A polymer interlayer that resists formation of iceflower defects, the polymer interlayer comprising:
    at least one soft layer wherein the soft layer comprises a blend of two or more poly(vinyl butyral) resins comprising:
        a first poly(vinyl butyral) resin having a first residual hydroxyl content;
        a second poly(vinyl butyral) resin having a second residual hydroxyl content, wherein the difference between the first residual hydroxyl content and the second residual hydroxyl content is at least 2.0 weight percent; and a high refractive index plasticizer having a refractive index of at least about 1.460, wherein the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof, wherein the first poly(vinyl butyral) resin, the second poly(vinyl butyral resin) and the high refractive index plasticizer are mixed and melt-extruded to form the at least one soft layer;

wherein the first poly(vinyl butyral) resin has a first glass transition temperature ($T_g$) of the plasticized first resin and the second poly(vinyl butyral) resin has a second glass transition temperature ($T_g$) of the plasticized second resin, and the second glass transition temperature ($T_g$) is from 15° C. to 40° C., and wherein the difference between the first and second glass transition temperatures ($T_g$) is at least 15° C.;

and wherein the soft layer of the polymer interlayer has at least one glass transition temperature ($T_g$) less than 15° C.;

at least one stiffer layer comprising a third poly(vinyl butyral resin) having a third residual hydroxyl content; and a plasticizer, wherein the polymer interlayer has a damping loss factor ($\eta$) (as measured by ISO 16940) of at least about 0.15 and a percent haze of less than 1.0% (as measured by a hazemeter in accordance with ASTM D1003-61 (Re-approved 1977)-Procedure A using Illuminant C, at an observer angle of 2 degrees).

2. The polymer interlayer of claim 1, wherein the second poly(vinyl butyral) resin is present in an amount of from about 5 weight percent to about 45 weight percent.

3. The polymer interlayer of claim 1, wherein the second poly(vinyl butyral) resin is present in an amount of from about 10 weight percent to about 40 weight percent.

4. The polymer interlayer of claim 1, wherein the soft layer of the polymer interlayer has at least one glass transition temperature ($T_g$) less than 0° C.

5. The polymer interlayer of claim 1, wherein the plasticizer is a mix of two or more plasticizers.

6. The polymer interlayer of claim 1, further comprising a second high refractive index plasticizer having a refractive index of at least 1.460.

7. The polymer interlayer of claim 1, wherein the polymer interlayer further comprises a plasticizer having a refractive index of less than about 1.450.

8. The polymer interlayer of claim 1, wherein the percent haze is less than 0.5% (as measured by ASTM D1003-61 (Re-approved 1977)-Procedure A using Illuminant C, at an observer angle of 2 degrees).

9. The polymer interlayer of claim 1, wherein the soft layer of the polymer interlayer has at least two different glass transition temperatures ($T_g$) and the difference between the at least two different glass transition temperatures ($T_g$) is at least 25° C.

10. The polymer interlayer of claim 9, wherein the first glass transition temperature ($T_g$) is less than 0° C. and the second glass transition temperature ($T_g$) is from 15° C. to 40° C.

11. The polymer interlayer of claim 1, wherein the plasticized first poly(vinyl butyral) resin has a glass transition temperature ($T_g$) less than 0° C. and the plasticized second poly(vinyl butyral) resin has a glass transition temperature ($T_g$) from 15° C. to 40° C.

12. A polymer interlayer that resists formation of ice-flower defects, the polymer interlayer comprising:

at least one soft layer wherein the soft layer comprises a blend of two or more poly(vinyl butyral) resins comprising:

a first poly(vinyl butyral) resin having a first residual hydroxyl content;

a second poly(vinyl butyral) resin having a second residual hydroxyl content, wherein the difference between the first residual hydroxyl content and the second residual hydroxyl content is at least 4.0 weight percent; and at least one plasticizer having a refractive index of at least 1.460 selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof, wherein the first poly(vinyl butyral) resin, the second poly(vinyl butyral resin) and the at least one plasticizer having a refractive index of at least 1.460 are mixed and melt-extruded to form the at least one soft layer;

and wherein the plasticized first poly(vinyl butyral) resin has a glass transition temperature ($T_g$) less than 0° C. and the plasticized second poly(vinyl butyral) resin has a glass transition temperature ($T_g$) from 15° C. to 40° C. and wherein the difference between the first and second glass transition temperatures ($T_g$) is at least 15° C.;

and wherein the soft layer of the polymer interlayer has at least one glass transition temperature ($T_g$) less than 15° C.;

at least one stiffer layer comprising a third poly(vinyl butyral resin) having a third residual hydroxyl content; and a plasticizer, wherein the polymer interlayer has a damping loss factor ($\eta$) (as measured by ISO 16940) of at least about 0.15 and a percent haze of less than 1.0% (as measured by a hazemeter in accordance with ASTM D1003-61 (Re-approved 1977)-Procedure A using Illuminant C, at an observer angle of 2 degrees).

13. The polymer interlayer of claim 12, wherein the plasticizer is a mix of two or more plasticizers.

14. The polymer interlayer of claim 12, wherein the second poly(vinyl butyral) resin is present in an amount of from about 5 weight percent to about 45 weight percent.

15. The polymer interlayer of claim 12, wherein the second poly(vinyl butyral) resin is present in an amount of from about 10 weight percent to about 40 weight percent.

16. The polymer interlayer of claim 12, further comprising a second high refractive index plasticizer having a refractive index of at least 1.460.

17. The polymer interlayer of claim 12, wherein the percent haze is less than 0.5% (as measured by ASTM D1003-61 (Re-approved 1977)-Procedure A using Illuminant C, at an observer angle of 2 degrees).

18. The polymer interlayer of claim 12, wherein the soft layer of the polymer interlayer has at least two different glass transition temperatures ($T_g$) and the difference between at least two different glass transition temperatures ($T_g$) is at least 25° C.

19. A polymer interlayer that resists formation of ice-flower defects, the polymer interlayer comprising:
- at least one soft layer wherein the soft layer comprises a blend of two or more poly(vinyl butyral) resins comprising:
- a first poly(vinyl butyral) resin having a first residual hydroxyl content;
- a second poly(vinyl butyral) resin having a second residual hydroxyl content, wherein the difference between the first residual hydroxyl content and the second residual hydroxyl content is at least 2.0 weight percent; and
- a high refractive index plasticizer having a refractive index of at least about 1.460, wherein the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bisphenol A bis(2-ethylhexaonate), di-(butoxyethyl) terephthalate, di-(butoxyethyoxyethyl) terephthalate, and mixtures thereof, wherein the first poly(vinyl butyral) resin, the second poly(vinyl butyral resin) and the high refractive index plasticizer are mixed and melt-extruded to form the at least one soft layer;
- wherein the soft layer of the polymer interlayer has at least two different glass transition temperatures ($T_g$) and the difference between the at least two different glass transition temperatures ($T_g$) is at least 15° C., wherein the first poly(vinyl butyral) resin has a first glass transition temperature ($T_g$) of the plasticized first resin and the second poly(vinyl butyral) resin has a second glass transition temperature ($T_g$) of the plasticized second resin, and the second glass transition temperature ($T_g$) is from 15° C. to 40° C.;
- at least one stiffer layer comprising a third poly(vinyl butyral resin) having a third residual hydroxyl content; and
- a plasticizer,
- wherein the polymer interlayer has a damping Loss Factor ($\eta$) (as measured by ISO 16940) of at least about 0.15 and a percent haze of less than 1.0% (as measured by a hazemeter in accordance with ASTM D1003-61 (Re-approved 1977)-Procedure A using Illuminant C, at an observer angle of 2 degrees), and wherein the second poly(vinyl butyral) resin is present in in amount of from about 5 weight percent to about 45 weight percent.

20. The polymer interlayer of claim 19, further comprising a second plasticizer, wherein the second plasticizer has a refractive index of less than about 1.450.

* * * * *